(12) United States Patent
Xu et al.

(10) Patent No.: US 11,651,208 B2
(45) Date of Patent: May 16, 2023

(54) TRAINING ACTION SELECTION NEURAL NETWORKS USING A DIFFERENTIABLE CREDIT FUNCTION

(71) Applicant: DEEPMIND TECHNOLOGIES LIMITED, London (GB)

(72) Inventors: Zhongwen Xu, London (GB); Hado Phillip van Hasselt, London (GB); Joseph Varughese Modayil, London (GB); Andre da Motta Salles Barreto, London (GB); David Silver, London (GB)

(73) Assignee: DeepMind Technologies Limited, London (GB)

( * ) Notice: Subject to any disclaimer, the term of this patent is extended or adjusted under 35 U.S.C. 154(b) by 585 days.

(21) Appl. No.: 16/615,042

(22) PCT Filed: May 22, 2018

(86) PCT No.: PCT/EP2018/063279
§ 371 (c)(1),
(2) Date: Nov. 19, 2019

(87) PCT Pub. No.: WO2018/211139
PCT Pub. Date: Nov. 22, 2018

(65) Prior Publication Data
US 2020/0175364 A1 Jun. 4, 2020

Related U.S. Application Data

(60) Provisional application No. 62/509,024, filed on May 19, 2017.

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC .......... G06N 3/08; G06N 3/04; G06N 3/0445; G06N 3/006; G06N 3/0454; G06N 20/00;
(Continued)

(56) References Cited

U.S. PATENT DOCUMENTS 5,602,761 A * 2/1997 Spoerre ................. G01H 1/003
702/179
2018/0032864 A1 * 2/2018 Graepel .................. G06N 3/08

OTHER PUBLICATIONS

Theodoridis et al. "The Fuzzy Sars'a' (λ) Learning Approach Applied to a Strategic Route Learning Robot Behaviour", Oct. 9-15, 2006 https://ieeexplore.ieee.org/document/4058632/figures#figures https://ieeexplore.ieee.org/stamp/stamp.jsp?tp=&arnumber=4058632 &tag=1 (Year: 2006).*

(Continued)

*Primary Examiner* — Yogeshkumar Patel
(74) *Attorney, Agent, or Firm* — Fish & Richardson P.C.

(57) ABSTRACT

Methods, systems, and apparatus, including computer programs encoded on computer storage media, for reinforcement learning. A reinforcement learning neural network selects actions to be performed by an agent interacting with an environment to perform a task in an attempt to achieve a specified result. The reinforcement learning neural network has at least one input to receive an input observation characterizing a state of the environment and at least one output for determining an action to be performed by the agent in response to the input observation. The system includes a reward function network coupled to the reinforcement learning neural network. The reward function network has an input to receive reward data characterizing a reward provided by one or more states of the environment and is (Continued)

configured to determine a reward function to provide one or more target values for training the reinforcement learning neural network.

21 Claims, 3 Drawing Sheets

(58) Field of Classification Search
CPC ......... G06N 5/003; A63F 13/67; A63F 13/58; A63F 13/833
See application file for complete search history.

(56) References Cited

OTHER PUBLICATIONS

Ni et al. "Goal Representation Heuristic Dynamic Programming on Maze Navigation", Dec. 12, 2013 https://ieeexplore.ieee.org/document/6565386/figures#figures https://ieeexplore.ieee.org/stamp/stamp.jsp?tp=&arnumber=6565386 (Year: 2013).*
Barnard, "Temporal-difference methods and Markov models," IEEE Transactions on Systems, Man, and Cybernetics, Mar. 1993, 23(2):357-365.
Bellemare et al., "The arcade learning environment: An evaluation platform for general agents," Journal of Artificial Intelligence Research, Jun. 2013, 47:253-279.
Downey et al., "Temporal difference bayesian model averaging: A bayesian perspective on adapting lambda," Proceedings of the 27th International Conference on Machine Learning, Jun. 2010, 8 pages.
Jaderberg et al., "Reinforcement Learning with Unsupervised Auxiliary Tasks," https://arxiv.org/abs/1611.05397, Nov. 2016, 14 pages.
Kearns et al., "Bias-Variance Error Bounds for Temporal Difference Updates," Proceedings of the 13th Annual Conference on Computational Learning Theory, 2000, 142-147.
Kingma et al., "Adam: A Method for Stochastic Optimization," https://arxiv.org/abs/1412.6980v1, Dec. 2014, 9 pages.
Konidaris et al., "Td_gamma: Re-evaluating complex backups in temporal difference learning," In Advances in Neural Information Processing Systems, Dec. 2011, 9 pages.
Mahmood et al., "Multi-step Off-policy Learning Without Importance Sampling Ratios," https://arxiv.org/abs/1702.03006, Feb. 2017, 24 pages.
Mann et al., "Adaptive Lambda Least-Squares Temporal Difference Learning," https://arxiv.org/abs/1612.09465, Dec. 2016, 7 pages.
Minsky, "Steps toward Artificial Intelligence," Proceedings of the IRE, Jan. 1961, 49(1):8-30.
Mnih et al., "Asynchronous Methods for Deep Reinforcement Learning," 33rd International Conference on Machine Learning, Jun. 2016, 10 pages.
Mnih et al., "Human-level control through deep reinforcement learning," Nature, Feb. 2015, 518:529-533.
Mnih et al., "Playing Atari with Deep Reinforcement Learning," https://arxiv.org/abs/1312.5602, Dec. 2013, 9 pages.
PCT Internation Preliminary Report on Patentability in International Appln. No. PCT/EP2018/063279, dated Nov. 28, 2019, 9 pages.
PCT International Search Report and Written Opinion in International Appln. No. PCT/EP2018/063279, dated Sep. 3, 2018, 15 pages.
Schulman et al., "High-Dimensional Continuous Control Using Generalized Advantage Estimation," https://arxiv.org/abs/1506.02438v1, Jun. 2015, 9 pages.
Seijen et al., "True Online Temporal-Difference Learning," https://arxiv.org/abs/1512.04087, Sep. 2016, 40 pages.
Singh et al., "Analytical Mean Squared Error Curves for Temporal Difference Learning," Machine Learning, Jul. 1998, 32:5-40.
Sutton et al., "Fast Gradient-Descent Methods for Temporal-Difference Learning with Linear Function Approximation," Proceedings of the 26th Annual International Conference on Machine Learning, Jun. 2009, 993-1000.
Sutton, "Learning to Predict bv the Methods of Temporal Differences," Machine learning, Aug. 1988, 3:9-44.
Van Hasselt et al., "Learning to Predict Independent of Span," https://arxiv.org/abs/1508.04582, Aug. 2015, 32 pages.
Van Seijen et al., "True Online Temporal-Difference Learning," https://arxiv.org/abs/1512.04087v2, last revised Sep. 2016, 40 pages.
Wang et al., "Dueling Network Architectures for Deep Reinforcement Learning," International Conference on Machine Learning, Jun. 2016, 9 pages.
Watkins, "Learning from Delayed Rewards," Thesis Submitted for Ph.D., King's College, May 1989, 241 pages.
White et al., "A Greedy Approach to Adapting the Trace Parameter for Temporal Difference Learning," https://arxiv.org/abs/1607.00446v1, Jul. 2016, 11 pages.
Williams, "Simple Statistical Gradient-Following Algorithms for Connectionist Reinforcement Learning," Machine learning, May 1992, 8(3-4):229-256.
Office Action in European Appln. No. 18726144.1, dated Nov. 17, 2021, 9 pages.
Sutton et al., "Learning to predict independent of span," CoRR, Aug. 2015, arxiv.org/abs/1508.04582, 32 pages.
Wulfmeier et al., "Maximum Entropy Deep Inverse Reinforcement Learning," CoRR, Jul. 2015, arxiv.org/abs/1507.04888, 10 pages.
Yang et al., "Task-specific pre-learning to improve the convergence of reinforcement learning based on a deep neural network," 2016 12th World Congress on Intelligent Control and Automation, Jun. 2016, pp. 2209-2214.

* cited by examiner

TRAINING ACTION SELECTION NEURAL NETWORKS USING A DIFFERENTIABLE CREDIT FUNCTION

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes how a system implemented as computer programs on one or more computers in one or more locations can adjust the parameters of a neural network used to select actions to be performed by an agent interacting with an environment in response to received observations.

This specification generally describes a reinforcement learning system that selects actions to be performed by a reinforcement learning agent interacting with an environment. In order for the agent to interact with the environment, the system receives data characterizing the current state of the environment and selects an action to be performed by the agent in response to the received data. Data characterizing a state of the environment will be referred to in this specification as an observation.

In some implementations, the environment is a simulated environment and the agent is implemented as one or more computer programs interacting with the simulated environment. For example, the simulated environment may be a video game and the agent may be a simulated user playing the video game. As another example, the simulated environment may be a motion simulation environment, e.g., a driving simulation or a flight simulation, and the agent is a simulated vehicle navigating through the motion simulation. In these implementations, the actions may be control inputs to control the simulated user or simulated vehicle. In another example the simulated environment may be the environment of a robot and the agent may be a simulated robot. The simulated robot may then be trained to perform a task in the simulated environment and the training transferred to a system controlling a real robot.

In some other implementations, the environment is a real-world environment and the agent is an agent, for example a mechanical agent, interacting with the real-world environment to perform a task. For example the agent may be a robot interacting with the environment to accomplish a specific task. As another example, the agent may be an autonomous or semi-autonomous vehicle navigating through the environment. In these implementations, the actions may be control inputs to control the agent, for example the robot or autonomous vehicle. In still other examples the real-world environment may be a manufacturing plant or service facility, the observations may relate to operation of the plant or facility, for example to resource usage such as power consumption, and the agent may control actions or operations in the plant/facility, for example to reduce resource usage.

In one innovative aspect the subject matter described in this specification can be embodied in a neural network system for reinforcement learning which comprises a reinforcement learning neural network and a reward function network coupled to the reinforcement learning neural network. The reinforcement learning neural network selects actions to be performed by an agent interacting with an environment to perform a task in an attempt to achieve a specified result. Thus the reinforcement learning neural network preferably has at least one input to receive an input observation characterizing a state of the environment, and at least one output for determining an action to be performed by the agent in response to the input observation. The reward function network may receive reward data characterizing a reward provided by one or more states of the environment, and may determine a reward function. The reward function may provide one or more target values for training the reinforcement learning neural network.

The reward function may comprise a weighted sum of reward predictions for n future action steps, where n is an integer equal to, or preferably greater than, 1. The weighted sum may comprise an exponentially weighted sum with decay parameter $\lambda$ defining a decay of the weighted sum away from a current time step, for example into the future. An update of the reinforcement learning network based on this weighted sum may be performed periodically, for example every n action (time) steps. In some implementations the weighted sum defines a $\lambda$-return value. The $\lambda$-return value is defined by the reward function network, and is differentiable, and may thus be trained by gradient ascent/descent. Training the system may involve propagating errors through both the reinforcement learning neural network and the reward function network.

A value of $\lambda$ may be learned by the reward function network, as a global parameter or as a (time) state-dependent parameter. In some implementations the reinforcement learning system may be an actor-critic system such as the Asynchronous Advantage Actor-critic (A3C) system described in Minh et al. 2016, "Asynchronous methods for deep reinforcement learning". Such a system may determine both an action policy mapping states to actions (the actor) a value function for the current state (the critic). The value function may be used by the reward function network to determine the target values for training the reinforcement learning neural network. In other implementations the reinforcement learning system may be a Q-learning system which estimates an action value, the expected return for selecting the action and thereafter following the policy mapping states to actions, and the value of a state defined by the expected return for following the policy from the state.

In some implementations the reward function network includes or more learnable parameters to determine a value for $\lambda$ and target values generated by the reward function network are dependent upon the determined $\lambda$-value. The reward function network may include a $\lambda$-determining neural network, coupled to the reinforcement learning neural network to determine the $\lambda$-value from a state of a hidden layer of the reinforcement learning neural network. In this way the $\lambda$-value may depend on the state of the environment.

The target values generated by the reward function network may comprise λ-return values.

The neural network system may include a reward function target generator to generate reward function targets for training the one or more learnable parameters of the reward function network. These targets may comprise alternate λ-return values generated independently of the one or more target values from the reward function network. For example the reward function target generator may be configured to perform an alternate rollout from a current state of the environment to determine the reward function targets. Additionally or alternatively the system may include memory to store previously generated target values for the reinforcement learning neural network, which may later be retrieved to provide the reward function targets.

In some implementations the reinforcement learning neural network may comprise a recurrent neural network and may provide a representation of a sequence of states of the environment comprising a sequence of state-dependent values. The reward function network may then be configured to generate the target values from the sequence of state-dependent values.

The reward function network may include an input to receive state-dependent reward value data for the sequence of states. As previously described the system may include episodic memory to store state and reward data from previous states of the system. The reward function network may be configured to receive reward data from the episodic memory, and/or state and reward data from a source different to that used for the training. This may be used to provide data defining a rollout from a current state of the environment on a different trajectory, which is useful for training the reward function network.

In another aspect a method of training a reinforcement learning neural network may comprise performing a plurality of reinforcement learning steps on input observation data characterizing a state of an environment to learn an action policy for the reinforcement learning neural network. The reinforcement learning neural network may be trained using a weighted set of n step returns where n is an integer equal to or greater than one and an n step return defines an estimated reward return for a plurality of n action (time) steps. The method may further involve jointly training a reward function network with the reinforcement learning neural network to learn a parameter (λ) defining a rate of exponential decay of the weighted set of n step returns with a number of steps over which the return is calculated.

The method may include independently sampling states of the environment as previously described to determine a target for training the reward function network.

The subject matter described in this specification can be implemented in particular embodiments so as to realize one or more of the following advantages.

Implementations of the system facilitate improved training of reinforcement learning systems, in particular achieving superior performance in such systems when trained. Implementations of the system may be trained online on a stream of data, or offline using stored data, or both. The system can automatically adapt its training to particular training tasks, learning to perform these tasks better. This helps to automate the training process and enables implementations of the system to be used across a wider range of different tasks without needing to be adapted to a particular task. More particularly the ability to learn faster may reduce the amount of training data, and hence memory requirements, needed to achieve a given level of performance. As a corollary, the described systems may also require reduced computing resources to achieve a given level of performance, since this may be achieved with less training than with previous techniques. The eventual performance of a trained system may also be better than with previous techniques.

The techniques can be used with a wide variety of reinforcement learning systems including, but not limited to, Deep Q-learning Network (DQN) systems, Double-DQN systems, Advantage Actor Critic (A3C) systems, and other reinforcement learning systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a reinforcement learning system implemented as computer programs on one or more computers in one or more locations that selects actions to be performed by a reinforcement learning agent interacting with an environment by using a neural network. This specification also describes how such a system can adjust the parameters of the neural network.

The system has an advantage that an agent such as a robot, or autonomous or semi-autonomous vehicle can improve its interaction with a simulated or real-world environment. It can enable for example the accomplishment of a specific task or improvement of navigation through or interaction with the environment.

Some implementations of the system address the problem of assigning credit for an outcome to a sequence of decisions which led to the outcome. More particularly they aim to improve the estimation of the value of a state given a subsequent sequence of rewards, and hence improve the speed of learning and final performance level achieved. They also reduce the need for hyperparameter fine tuning, and hence are better able to operate across a range of different problem domains.

In order to interact with the environment, the agent receives data characterizing the current state of the environment and performs an action from an action space, i.e., a discrete action space or continuous action space, in response to the received data. Data characterizing a state of the environment will be referred to in this specification as an observation.

In some implementations the environment is a simulated environment and the agent is implemented as one or more computers interacting with the simulated environment. For example the simulated environment may be a video game and the agent may be a simulated user playing the video game.

In other implementations the environment is a real-world environment and the agent is a mechanical agent interacting with the real-world environment. For example, the agent may be a robot interacting with the environment to accomplish a specific task or an autonomous or semi-autonomous vehicle navigating through the environment. In these cases the observation can be data captured by one or more sensors of the agent as it interacts with the environment, e.g., a camera, a LIDAR sensor, a temperature sensor, and so forth.

Figure 1:
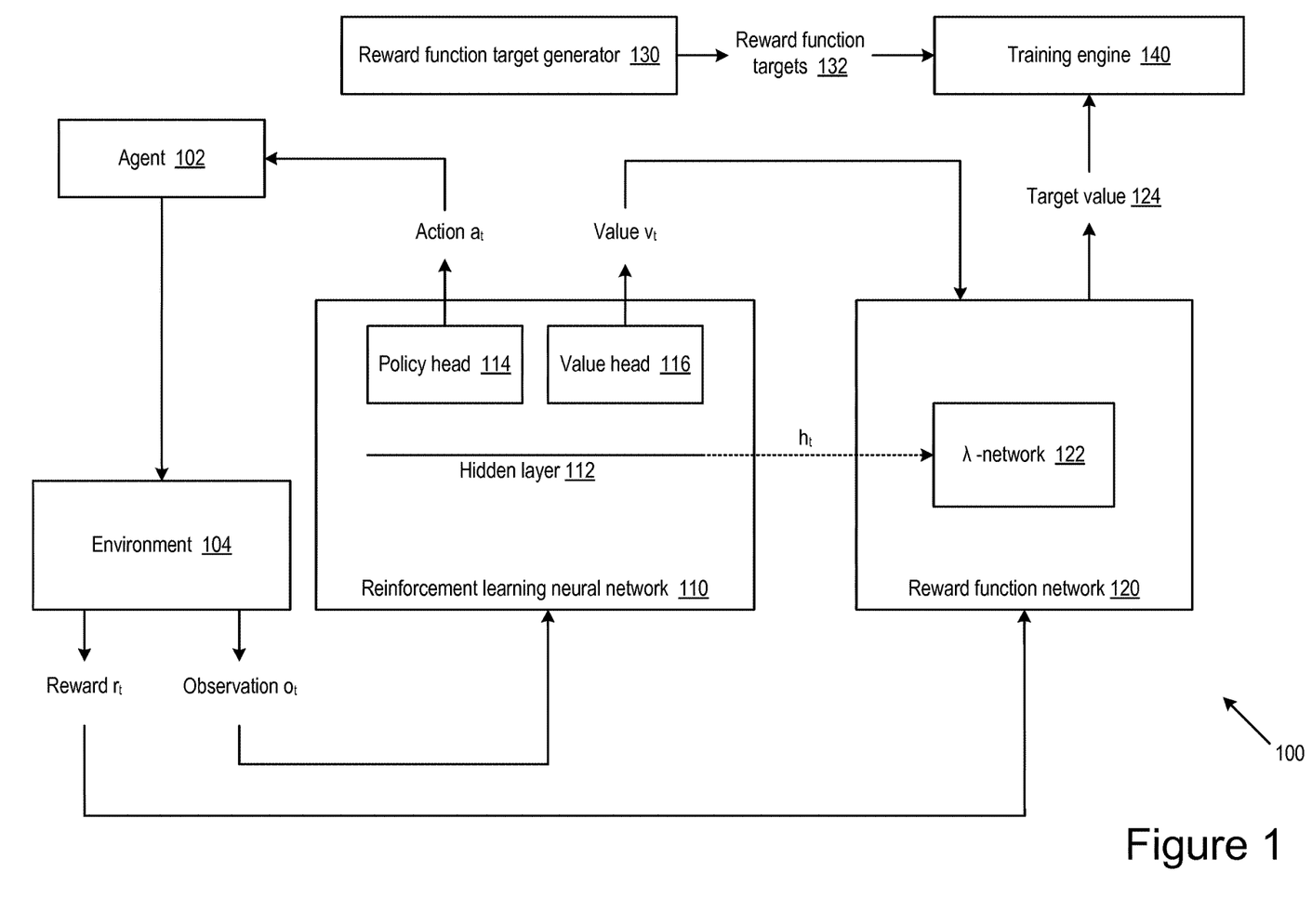
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The reinforcement learning system 100 selects actions to be performed by a reinforcement learning agent 102 interacting with an environment 104. That is, at each of a plurality of internal time steps, t, the reinforcement learning system 100 receives an observation $o_t$, characterizing a respective state $s_t$ of the environment 104 and a scalar reward $r_t$, and, in response to the observation, selects an action $a_t$ from an action space to be performed by the reinforcement learning agent 102 in response to the observation and then instructs or otherwise causes the agent 102 to perform the selected action. After the agent 102 performs a selected action, the environment 104 transitions to a new state $s_{t+1}$ and the system 100 receives another observation $o_{t+1}$ characterizing the new state $s_{t+1}$ and a reward $r_{t+1}$. In general the state of the environment is a function of the actions, observations, and rewards leading up to that state, $s_t = o_1, a_1, r_2 \ldots s_{t-1}, s_{t-1}, r_t$. The reward can be a numeric value that is received by the system 100 or the agent 102 from the environment 104 as a result of the agent 102 performing the selected action. That is, the reward received by the system 100 generally varies depending on the result of the transition of states caused by the agent 102 performing the selected action. For example, a transition into a state that is closer to completing a task being performed by the agent 102 may result in a higher reward being received by the system 100 than a transition into a state that is farther from completing the task being performed by the agent 102.

In particular, to select an action, the reinforcement learning system 100 includes a reinforcement learning neural network 110. Generally, the reinforcement learning neural network 110 is a neural network that is configured to receive an observation and to process the observation to generate an output that defines the action that should be performed by the agent in response to the observation.

In some implementations, the reinforcement learning neural network 110 comprises a hidden layer 112 which provides an input to a policy head 114. The reinforcement learning neural network 110 may, for example, comprise one or more convolutional neural network layers and/or one or more fully connected layers. It may comprise a recurrent neural network. The policy head may comprise one or more additional neural network layers.

The policy head generates a policy output π that defines a probability distribution over possible actions. The probability for each action is the probability that the action is the one that maximizes a long-term reward that will result from the environment being in the state characterized by the input observation, for example the chances of the agent completing the task. Thus the policy output π may comprise a respective score for each action of a predetermined set of actions, where the scores each represent a likelihood that the corresponding action is the action that should be performed. To select an action the reinforcement learning system may sample from the actions in accordance with the scores for the actions.

In some implementations, the reinforcement learning neural network 110 also has a value head 116 comprising one or more neural network layers with an input from the hidden layer 112. The value head 116 generates a value function output 118 that represents the value of a state, that is an estimated long-term reward received by the agent starting from the state characterized by the input observation. The value function is described in more detail later.

In the illustrated example the policy and value heads share the parameters of the reinforcement learning neural network 110. However in other implementations the policy and value outputs may be outputs from separate policy and value neural networks.

The reinforcement learning system 100 also includes a reward function network 120. The reward function network receives the reward data from the environment, and value outputs from the value head, and generates target values for training the reinforcement learning neural network 110. More particularly the reward function network learns to generate target values 124 using a reward function, in implementations λ-return values, which aim to optimally assign credit to a particular state.

The reward function network thus comprises one or more learnable parameters and may comprise a neural network. In some implementations these parameters define a λ-value which is used by the reward function network to determine a λ-return value. The λ-return value may be an exponentially decaying weighted sum of n-step return predictions in which the λ-value, which is between 0 and 1, defines a decay rate of the weighted sum with increasing n. The λ-return is described further later.

In some implementations the λ-value is defined by a λ-network 122, that is a neural network which receives an input $h_t$ from a hidden layer of the reinforcement learning neural network 110, for example the hidden layer 112 providing an input to the policy and value heads. The λ-network 122 may comprise one or more layers, for example a single fully-connected layer. A sigmoid function may be applied to the output of the λ-network 122 to constrain the output in the range [0,1]. In these implementations the λ-value depends on the state of the environment at a time t and may be denoted $λ_t$.

In some other implementations the λ-value is defined by a single learnable parameter which defines a global λ-value, λ, that is independent of the state of the environment. In these implementations the single learnable parameter may be independent of the reinforcement learning neural network 110.

A target value generated by the reward function network should ideally match the true value for a state but the true value for a state is not available. Instead the reward function network learns to generate λ-return target values which match a proxy for the true value of a state. A reward function target generator 130 generates reward function targets 132, such as the alternate returns $g'_t$ described later. These are used by the training engine to update the reward function network 120, more specifically λ. Thus λ adapts as training of the reinforcement learning system progresses.

The alternate returns provide a target for learning the one or more learnable parameters of the reward function network 120; they may comprise an independent sample of the true value of a state. In some implementations, where the environment is simulated, an independent sample may generated by resetting the environment and the agent, that is the reinforcement learning neural network 110, to an earlier state and performing another rollout. In some implementations, for example where the environment is not simulated, episodic memory (not shown) may be provided to store λ-returns which can later be read from the memory to provide target λ-return values for λ-value learning. The λ-returns may be stored in association with other data from the environment, for example state value data or embeddings of observations of the environment.

Training of both the reinforcement learning neural network 110 and the reward function network 120 is controlled by a training engine 140, as described in more detail later.

The value function of a state s is defined by the expected discounted sum of future rewards from the state when actions are selected according to a policy. An estimate of the true value function may be made by accumulating n steps of actual (discounted) reward and then bootstrapping the estimate by updating it towards the estimated reward at a time n steps into the future. This provides an n-step return, but rather than use a single value of n a weighted average of n-step returns may be employed in which the weights decrease according to $(1-\lambda)\lambda^n$ with λ in the range [0,1]. This gives a λ-return $g_t$ which is convenient to determine recursively:

$$g_t = r_{t+1} + \gamma(1-\lambda)v(s_{t+1}, \theta_t) + \gamma\lambda g_{t+1}$$

where γ is a discount factor in the range [0,1] and $v(s_{t+1}, \theta_t)$ is the value function output for state $s_{t+1}$ as determined by value function parameters $\theta_t$ of the reinforcement learning neural network 110. In implementations the discount factor γ is a hyperparameter of the system.

The λ-return partially bootstraps on each step, that is the value of λ determines the relative weight placed on the rewards and the learned value function. If the learned value function is poor setting λ≈1 biases the λ-return towards the actual rewards; if the rewards are noisy setting λ≈0 biases the λ-return towards the value function. The techniques described herein allow λ to adapt online during training of the reinforcement learning system. In some implementations λ may also adapt to the state of the environment. For example where the agent is a vehicle or robot the value of λ could adjust to the level of lighting, approaching 1 in where the light level is low and hence the value estimate untrustworthy.

In some implementations the parameters of the reinforcement learning neural network responsible for the value function estimation are adjusted after every time step t by stochastic gradient descent so as to minimize a squared error between the value function output and the λ-return $g_t$, which is treated as a constant target.

As previously described, in some implementations the reinforcement learning neural network 110 receives observations $o_t$, determines a hidden representation of the current state $h_t$ and provides a policy output for selecting an action $a_t$ and a value function output defining a predicted value $v_t$ for the state. At the end of a training episode, which may be defined by completion of a task, or after an n-step sequence, the reward function network computes a retrospective estimate of a λ-return value $g_t$ using the current value of λ, the rewards $r_t$ and the predicted values $v_t$ according to:

$$g_t = r_{t+1} + \gamma(1-\lambda_{t+1})v_{t+1} + \gamma\lambda_{t+1}g_{t+1}$$

Figure 2:
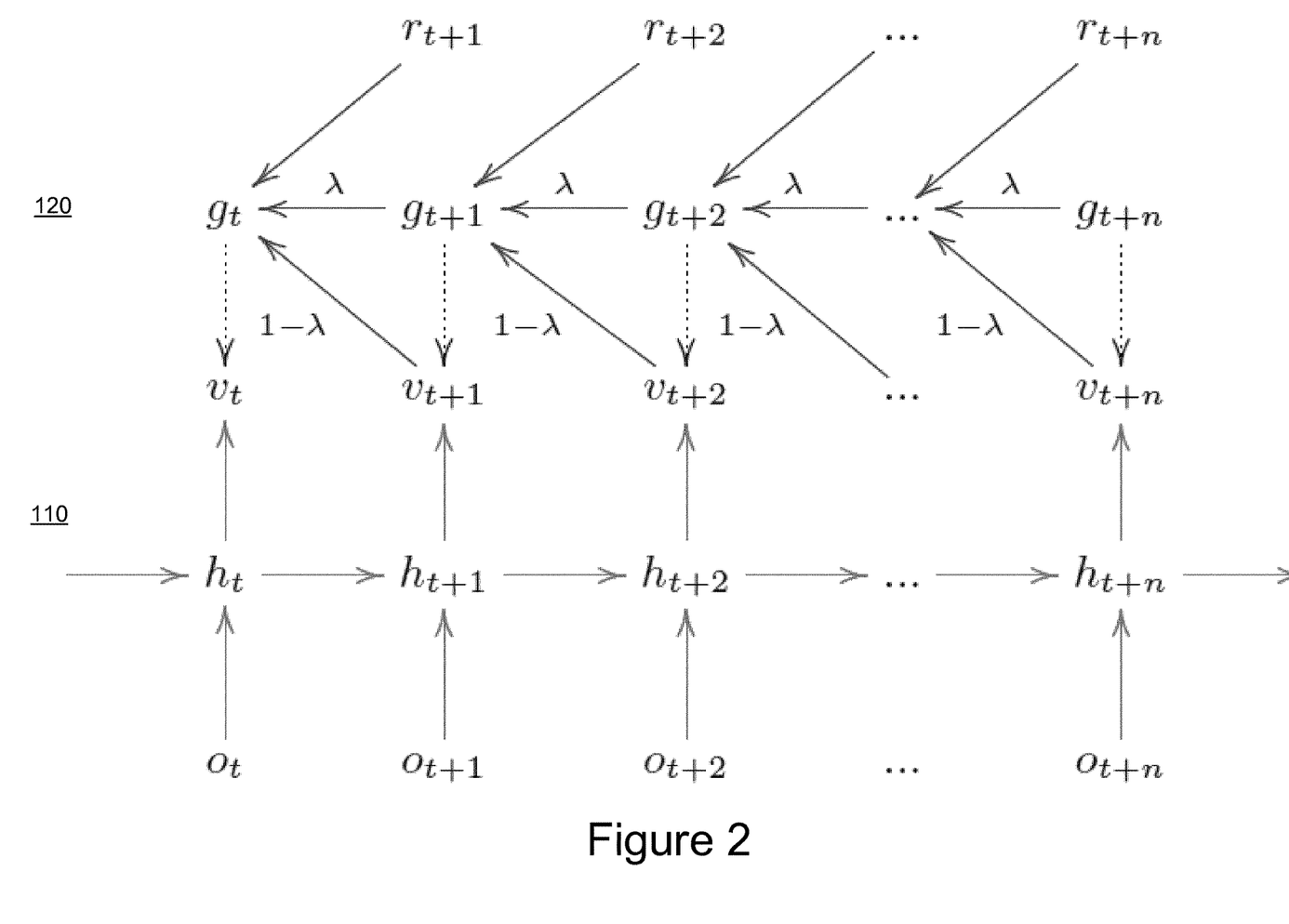
FIG. 2 illustrates the computational flows in an example of the system of FIG. 1.

FIG. 2 illustrates a procedure for computation of a reward function, more particularly the λ-return value $g_t$, by the reward function network. The lower part of FIG. 2 represents operations performed by the reinforcement learning neural network which, in this example, comprises a recurrent neural network. The upper part of FIG. 2 represents operations performed by the reward function network. The arrows in FIG. 2 represent the direction of computation and thus after each episode, or after each set of n-steps, the λ-return value $g_t$ is calculated recursively in a sweep backwards through the sequence of recent $r_t$ and $v_t$ values.

Thus the reward function network may comprise a learnable parameter or a neural network defining the λ-value, and may perform a computation which has an architecture represented by FIG. 2 to determine the λ-return value. Conceptually, therefore, the computational architecture of FIG. 2 may be considered to represent a network.

Conceptually λ may be viewed as a gating function on the sequence of rewards. When $\lambda_t=0$ the value function is updated towards the predicted value $v_t$; when $\lambda_t=1$ the value function is updated towards real rewards. In some implementations $\lambda_t$ is determined by λ-network 122 and is a function of the state $s_t$ and optionally additional parameters η. In other implementations the reward function network uses a single global value for λ, that is $\lambda_t=\lambda$. In some implementations a maximum length n may be defined at which length the λ-return is bootstrapped such that $\lambda_{t+n}=0$ and $g_{t+n}=v_{t+n}$.

As described later, the λ-return value is differentiable in the one or more parameters of the reward function network, and thus maybe optimized by gradient descent. To learn the one or more parameters of the reward function network a λ-return reward function target $g'_t$ is determined. In one approach an independent sample of the λ-return is used as a target. This alternate return $g'_t$ is generated by resetting both the agent and the environment to state $s_t$ and then performing a second m-step rollout. This is in general different from the first rollout because of randomness in the environment and randomness in the action policy. A target discounted return may defined by accumulating m real rewards and combining this with the value function m steps into the future:

$$g'_t = \sum_{k=1}^{m} \gamma^{k-1} r'_{t+k} + \gamma^m v(S_{t+m}, \theta_t)$$

where $S_{t+m}$ represents the states of the second rollout and $\theta_t$ are the value function parameters of the reinforcement learning neural network.

With a sufficiently large number of steps m this provides an unbiased estimate of the true value function. The alternate return $g'_t$ may be generated infrequently, for example every M>m steps. The reward function network may be updated by stochastic gradient descent to minimize a mean squared error between $g_t$ and $g'_t$. The target $g'_t$ does not depend on λ which avoids the system finding a degenerate solution in which λ of $g_t$ exactly matches λ of $g'_t$.

Where the environment cannot be reset an alternate value function trained from independent data may be used as the target return. Alternatively returns may be stored in episodic memory and the recalled returns may be used as a target for training λ.

Figure 3:
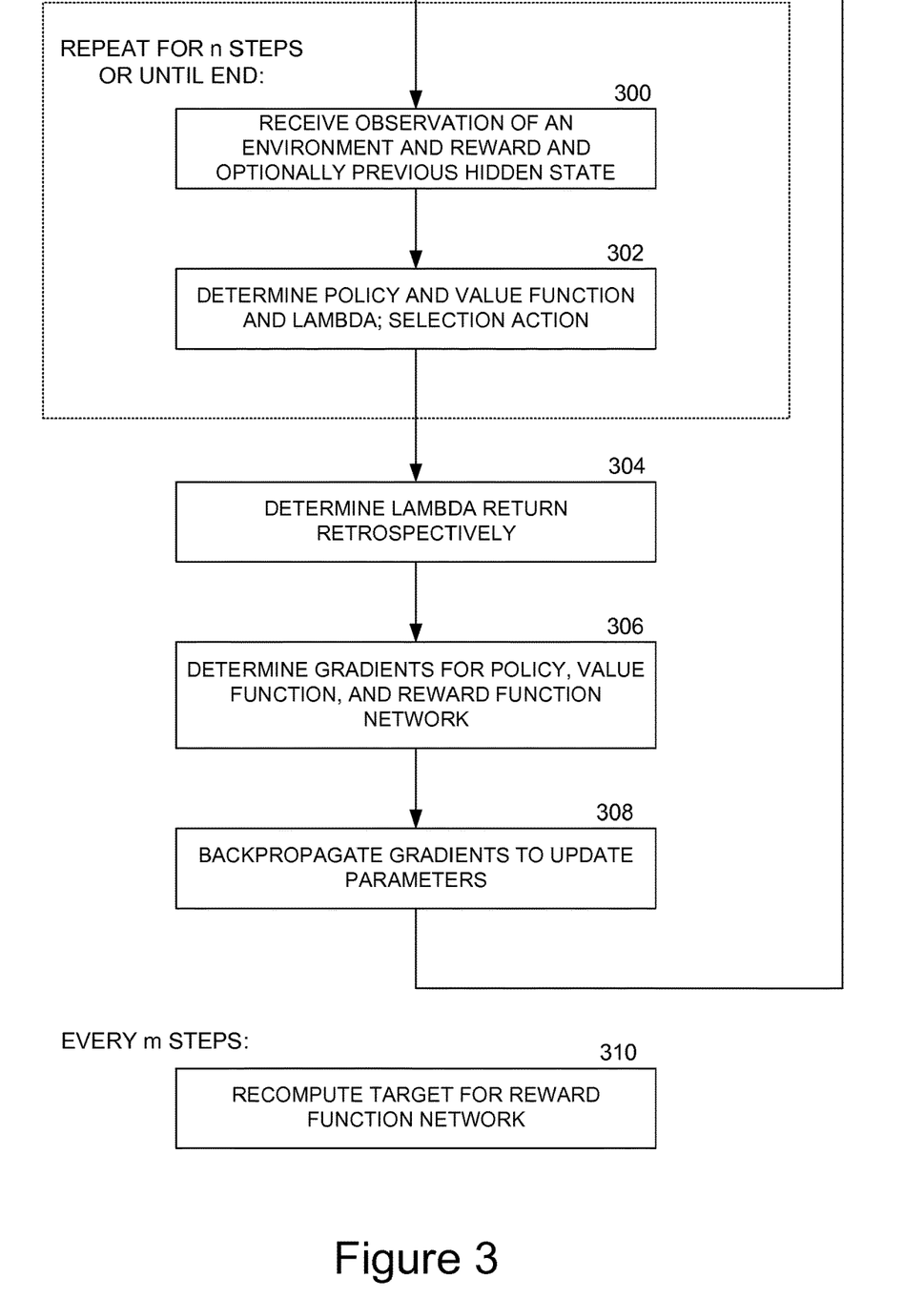
FIG. 3 is a flow diagram of an example process for training a neural network used to select actions to be performed by an agent interacting with an environment.

FIG. 3 shows a flow diagram of an example process for jointly training a reinforcement learning neural network and a reward function network of the types previously described.

In the example at each time step of a n-step rollout, or until a terminal state is reached, the reinforcement learning neural network receives an observation $o_t$ and a reward $r_t$ and, where the reinforcement learning neural network incorporates a recurrent neural network, a hidden state from the previous time step $h_{t-1}$ (step 300). The reinforcement learning neural network uses these to determine a policy $\pi_t$ defining action probabilities, a value function output $v_t$, and a lambda value $\lambda_t$ (or global lambda value λ). The reinforcement learning neural network then selects an action $a_t$ according to the policy $\pi_t$ (step 302).

The process then retrospectively determines a $\lambda$-return value $g_t$ using the reward function network using either $\lambda_t$ or $\lambda$ (step 304). This is used to determine gradients for updating the policy and value outputs of the reinforcement learning neural network, and also a gradient for updating the reward function network parameter(s) (step 306). These gradients are then backpropagated through the respective networks to update the parameters of these networks (step 308), and the process then continues with the next n-step rollout.

Every m steps the target $g'_t$ for the reward function network is recalculated as previously described (step 310). In an example implementation n=20, m=30, M=50.

In a variant of the process of FIG. 3 multiple workers may be employed, each with a respective copy of the environment and a corresponding set of network parameters. Each worker may be allocated a computational thread and may operate independently, periodically updating a set of shared network parameters. Thus a worker may make a copy of the shared parameters, perform an n-step rollout and determine gradients as previously described, and then use the gradients to update the shared network parameters.

A loss function J for the reinforcement learning neural network may comprise a policy term and a value term and a gradient of this loss may, in one example be defined as:

$$\nabla J = (v_t - g_t)\nabla \log \pi_t + c(v_t - g_t)\nabla v_t - c_H \nabla H(\pi_t)$$

where c is a hyperparameter, for example of value 1, defining the relative importance of the policy and value gradient terms, and where $H(\pi_t)$ denotes an entropy of the policy and $c_H$ is a hyperparameter, for example of value 0.001, defining the strength of the entropy regularization. The entropy term encourages exploration as where the network is certain, and thus an action has a high probability, the entropy is low. In practice for each term the gradient is taken with respect to the parameters of the relevant network. In this example the parameters of the policy output may be adapted using the first, policy gradient term and the parameters of the value output may be adapted using the second, value gradient term. The entropy term may be included in the policy gradient term.

A joint loss function for the reinforcement learning neural network and the reward function network may comprise an additional loss $J_\lambda$ for determining $\lambda$, so that the total loss $J_{tot} = J + J_\lambda$. The gradient of $J_\lambda$ may be used to update the parameter(s) defining $\lambda$, for example the parameters of the $\lambda$-network 122 determining $\lambda_t$ and $h_t$.

In some implementations $$J_\lambda = \frac{c_\lambda}{2}(v_t^\lambda - g'_t)^2$$

where $c_\lambda$ is a hyperparameter, for example of value 1, defining the relative importance of the $J_\lambda$ loss term and $$v_t^\lambda = (1-\lambda_t)v_t + \lambda_t g_t$$

As $g_t = r_{t+1} + \gamma v_{t+1}^\lambda$ the loss $J_\lambda$ can be interpreted as minimizing the difference between $g_t$ and $r_{t+1} + \gamma v_{t+1}^\lambda$ and thus the update to the $\lambda$-return uses at least one real reward.

The loss $J_\lambda$ is differentiable and if as an approximation $v_t$ is treated as constant the gradient of $J_\lambda$ with respect to the one or parameters defining the value of $\lambda$ is $$\nabla J_\lambda = c_\lambda(v_t^\lambda - g'_t)\nabla v_t^\lambda$$

where $$\nabla v_t^\lambda = \sum_{i=0}^{n-1} \gamma^i \left(\prod_{j=0}^{i-1} \lambda_{t+j}\right)(g_{t+i} - v_{t+i})\nabla \lambda_{t+i}$$

The approximate gradient of $J_\lambda$, $\nabla J_\lambda$ may be used to update the one or more learnable parameters of the reward function network. For example $\nabla J_\lambda$ may be backpropagated through the $\lambda$-network 122 to update the parameters of this network. The parameters of the reinforcement learning neural network below the hidden layer 112 may be updated using the gradients of both losses $J_\lambda$ and J.

In some other implementations the reinforcement learning system may be a Q-learning system; the reinforcement learning neural network values may then be state or action values. More generally other value estimates may be employed in implementations of the system, for example value estimates including a projected value component.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices storing instructions that when executed by the one or more computers cause the one or more computers to perform operations for reinforcement learning, the operations comprising:
at each of a sequence of time steps, controlling an agent using a reinforcement learning neural network to select an action to be performed by the agent at the time step to interact with an environment to perform a task given a state of the environment at the time step, the reinforcement learning neural network having at least one input to receive an input observation characterizing a state of the environment and at least one output for determining (i) an action to be performed by the agent in response to the input observation and (ii) a value estimate for the state characterized by the input observation;
for each time step, receiving, as a result of the agent performing the action at the time step, a respective reward value;
for each particular time step in the sequence of time steps, generating a respective target value for training the reinforcement learning neural network using a reward function network that is configured to map (i) the respective rewards at each of a plurality of time steps after the particular time step in the sequence and (ii) the respective value estimates generated at each of the plurality of time steps after the particular time step to a target value for the particular time step in accordance with one or more learned parameters of the reward function network; and
training the reinforcement learning neural network using the respective target values for the particular time steps determined using the reward function network.

2. A system as claimed in claim 1 wherein the target network computes the target value as a weighted sum of reward predictions for n future time steps, where n is an integer greater than 1.

3. A system as claimed in claim 2 wherein the weighted sum comprises an exponentially weighted sum with decay parameter $\lambda$ such that a target value $g_t$ for time step t satisfies:

$$g_t = r_{t+1} + \gamma(1-\lambda)v(s_{t+1}, \theta_t) + \gamma\lambda g_{t+1}$$

where $\gamma$ is a discount factor in a range [0,1] and $v(s_{t+1}, \theta_t)$ is a value estimate for state $s_{t+1}$ at time step t+1 as determined by value function parameters $\theta_t$ of the reinforcement learning neural network, and $g_{t+1}$ is the weighted sum for time step t+1.

4. A system as claimed in claim 3 wherein the one or more learnable parameters of the reward function network define a respective value for $\lambda$ for each of the plurality of time steps.

5. A system as claimed in claim 4 wherein $\lambda$ is a function of the time step.

6. A system as claimed in claim 1 wherein the reward function network includes or more learnable parameters to determine a $\lambda$-value; and wherein the target values for the time steps are dependent upon the $\lambda$-value.

7. A system as claimed in claim 6 wherein the reward function network includes a $\lambda$-network coupled to the reinforcement learning neural network to determine a respective $\lambda$-value for each time step from a state of the reinforcement learning neural network at the time step.

8. A system as claimed in claim 1 further comprising:
generating, using a reward function target generator, reward function targets for training the one or more learnable parameters of the reward function network.

9. A system as claimed in claim 8 wherein the reward function targets comprise alternate $\lambda$-return values generated independently of the target values for the time steps from the reward function network.

10. A system as claimed in claim 9 wherein the reward function target generator is configured to perform an alternate rollout from a state of the environment at a first time step of the plurality of time steps to determine the reward function targets.

11. A system as claimed in claim 9 wherein the reward function target generator is configured to retrieve stored target values that are stored in a memory to provide the reward function targets.

12. A system as claimed in claim 1 wherein the reinforcement learning neural network comprises a recurrent neural network to provide a representation of a sequence of states of the environment comprising a sequence of state-dependent values, and wherein the reward function network is configured to generate the target values for the time steps from the sequence of state-dependent values.

13. A system as claimed in claim 12 wherein the reward function network has an input to receive state-dependent reward value data for the sequence of states of the environment.

14. A system as claimed in claim 12 including episodic memory to store state and reward data from previous states of the system, and wherein the reward function network is configured to receive reward data from the episodic memory.

15. A method performed by one or more computers, the method comprising:
at each of a sequence of time steps, controlling an agent using a reinforcement learning neural network to select an action to be performed by the agent at the time step to interact with an environment to perform a task given a state of the environment at the time step, the reinforcement learning neural network having at least one input to receive an input observation characterizing a state of the environment and at least one output for determining (i) an action to be performed by the agent in response to the input observation and (ii) a value estimate for the state characterized by the input observation;
for each time step, receiving, as a result of the agent performing the action at the time step, a respective reward value;
for each particular time step in the sequence of time steps, generating a respective target value for training the reinforcement learning neural network using a reward function network that is configured to map (i) the respective rewards at each of a plurality of time steps after the particular time step in the sequence and (ii) the respective value estimates generated at each of the plurality of time steps after the particular time step to a target value for the particular time step in accordance with one or more learned parameters of the reward function network; and training the reinforcement learning neural network using the respective target values for the particular time steps determined using the reward function network.

16. A system as claimed in claim 1 wherein the target network computes the target value as a weighted sum of reward predictions for n future time steps, where n is an integer greater than 1.

17. A system as claimed in claim 2 wherein the weighted sum comprises an exponentially weighted sum with decay parameter $\lambda$ such that a target value $g_t$ for time step t satisfies:

$$g_t = r_{t+1} + \gamma(1+\lambda)v(s_{t+1}, \theta_t) + \gamma\lambda g_{t+1}$$

where $\gamma$ is a discount factor in a range [0,1] and $v(s_{t+1}, \theta_t)$ is a value estimate for state $s_{t+1}$ at time step t+1 as determined by value function parameters $\theta_t$ of the reinforcement learning neural network, and $g_{t+1}$ is the weighted sum for time step t+1.

18. A system as claimed in claim 3 wherein the one or more learnable parameters of the reward function network define a respective value for $\lambda$ for each of the plurality of time steps.

19. A system as claimed in claim 4 wherein $\lambda$ is a function of the time step.

20. A system as claimed in claim 1 wherein the reward function network includes or more learnable parameters to determine a $\lambda$-value; and wherein the target values for the time steps are dependent upon the $\lambda$-value.

21. One or more non-transitory computer-readable media storing instructions that when executed by one or more computers cause the one or more computers to perform operations comprising:

at each of a sequence of time steps, controlling an agent using a reinforcement learning neural network to select an action to be performed by the agent at the time step to interact with an environment to perform a task given a state of the environment at the time step, the reinforcement learning neural network having at least one input to receive an input observation characterizing a state of the environment and at least one output for determining (i) an action to be performed by the agent in response to the input observation and (ii) a value estimate for the state characterized by the input observation;

for each time step, receiving, as a result of the agent performing the action at the time step, a respective reward value;

for each particular time step in the sequence of time steps, generating a respective target value for training the reinforcement learning neural network using a reward function network that is configured to map (i) the respective rewards at each of a plurality of time steps after the particular time step in the sequence and (ii) the respective value estimates generated at each of the plurality of time steps after the particular time step to a target value for the particular time step in accordance with one or more learned parameters of the reward function network; and training the reinforcement learning neural network using the respective target values for the particular time steps determined using the reward function network.

* * * * *